United States Patent [19]

Mayer

[11] 4,009,702
[45] Mar. 1, 1977

[54] PISTON WITH TURBULENCE INDUCING FACE CONFIGURATION

[75] Inventor: Edward A. Mayer, Newburgh, N.Y.
[73] Assignee: Texaco Inc., New York, N.Y.
[22] Filed: Nov. 15, 1974
[21] Appl. No.: 524,295
[52] U.S. Cl. .................. 123/193 P; 123/30 D; 123/32 A; 123/32 ST; 123/191 B
[51] Int. Cl.² ............................. F02F 3/26
[58] Field of Search .......... 123/191 B, 32 ST, 32 B, 123/32 A, 193 P, 193 CP, 30 D

[56] References Cited
UNITED STATES PATENTS

| 2,172,170 | 9/1939 | Megroot | 123/191 B |
|---|---|---|---|
| 2,738,781 | 3/1956 | Bodine, Jr. | 123/191 B |
| 2,738,782 | 3/1956 | Bodine, Jr. | 123/191 B |
| 2,815,014 | 12/1957 | Adams | 123/191 B |
| 2,827,033 | 3/1958 | Bodine, Jr. | 123/191 B |
| 3,439,656 | 4/1969 | Hideg | 123/32 ST |
| 3,443,552 | 5/1969 | Von Seggern et al. | 123/32 ST |
| 3,504,681 | 4/1970 | Winkler | 123/32 ST |
| 3,658,046 | 4/1972 | Winkler | 123/32 ST |
| 3,872,841 | 3/1975 | Kimbara et al. | 123/32 ST |

Primary Examiner—Wendell E. Burns
Assistant Examiner—David D. Reynolds
Attorney, Agent, or Firm—T. H. Whaley; C. G. Ries; Robert B. Burns

[57] ABSTRACT

A piston structure for an internal combustion engine which utilizes fuel injection to furnish the engine charge. To provide a more effective operation, and to more fully utilize the air induced into the engine, the piston face is formed with a main cavity as well as with one or more supplementary depressions spaced away from the main cavity whereby to promote turbulence at the combustion chamber and consequently a better fuel-air mixture during a power stroke.

3 Claims, 8 Drawing Figures

PISTON WITH TURBULENCE INDUCING FACE CONFIGURATION

BACKGROUND OF THE INVENTION

In the operation of internal combustion engines, it is known that to form a stratified charge within the engine cylinders offers a number of operating advantages. Primarily, the provision of a stratified charge condition within the engine permits the use of a wider variety of fuels than is normally found with a premixed, carbureted charge. Further, by the proper regulation of the fuel flow, and its subsequent combustion, the combustion process can be completed quickly and efficiently thereby obtaining maximum power from the amount of fuel utilized.

It has also been determined that through the proper regulation of fuel and air introduction to the engine cylinders, the resulting quality of air polluting elements contained in the engine exhaust gas can be regulated. These air polluting elements such as $NO_x$ and CO can be minimized to a point where they are in compliance with strict standards which are set, and which are considered to be safe for automotive operation.

Toward facilitating the combustion process in an internal combustion engine, the use of a cavity or depression formed into the face of a piston is known. Such a cavity serves the function of not only providing an initial combustion chamber, but also, as in the present instance, increases the swirl rate of air which is introduced prior to forming the combustible charge.

As taught in U.S. Pat. No. 3,094,974, the controlled production of a swirling air stream, when coordinated with the rate of introduction of fuel, results in a highly efficient internal combustion engine operation. In said engine a predetermined quantity of fuel is injected into the combustion chamber, and an air stream is introduced through the engine intake port by means of a shrouded valve or similar means such that the entering air stream forms a rapidly rotating mass guided by the walls of the combustion chamber. The direction of swirl is such that air travels from the fuel injection nozzle toward the spark plug.

As noted herein a cavity formed in the piston tends to promote swirling of incoming air. More specifically, air is aspirated into the engine combustion chamber and caused to initially swirl by virtue of the intake valve and port shape. Thereafter, on the compression stroke, the rate of swirl is increased as the air is compressed into the combustion chamber and the small diameter piston cavity.

Although the concept of a cavity formed within a piston face has been utilized in several forms and variations to achieve varying purposes, the desired uniform charge forming criteria has not been fully attained. For example, the cavity configuration within a piston has been shown by the prior art in the form of a simple cup-like arrangement wherein the latter is provided with cylindrical walls opening at the piston face. Also, the use of a substantially spherical cavity which opens onto the piston face is known. In either instance the primary purpose of these depressed cup formations has been to form either a preliminary combustion chamber, or the means for promoting the rapid swirl of air through the cup and through the cylindrical combustion chamber.

A primary object of the present invention then is to provide an internal combustion engine piston construction having a piston face capable of promoting a more rapid, controlled combustion of a charge.

A further object is to provide a piston having a cavity or depression formed therein and terminating at the piston face, which cavity will receive a stream of fuel as well as swirling air, whereby to force an efficient mixing of the two into a combustible charge.

Still another object is to provide a piston having a cavity formed in the face thereof, as well as one or more supplementary depressions which receive air and burning fuel-air mixture which is spilled from the cavity during a power stroke whereby to assure more uniform and rapid combustion of the engine charge.

The above noted objectives are achieved, and the desired efficient operation of an internal combustion engine is obtained in the present invention by providing means for introducing a swirling air charge to the engine's one or more cylinders on the intake stroke of each. Each piston is provided with a cavity having a central axis extending substantially parallel to the piston axis and opening at the piston face.

Each piston is further provided with at least one and preferably with a plurality of depressions. The latter are formed into the piston face, being spaced and arranged to receive air which is drawn from the main cavity and into the cylinder combustion chamber during the power stroke. The overall effect is that the resulting turbulence induced by the air flowing through and across the various supplementary depressions, serves to more completely mix the charge and consequently promote a uniform combustion event.

DESCRIPTION OF THE DRAWINGS

In the drawings,

Referring to FIG. 2, an internal combustion engine 10 of the type presently contemplated is shown generally as comprising a plurality of cylinders, each of which slidably positions a piston. The engine shown for illustrating the invention is generally of the in-line cylinder type utilizing fuel injection for forming the combustible charge. The fuel in such an instance is metered to each cylinder from a fuel metering pump 12 which is in turn communicated with a source of fuel such as a tank 15 or the like.

Figure 1:
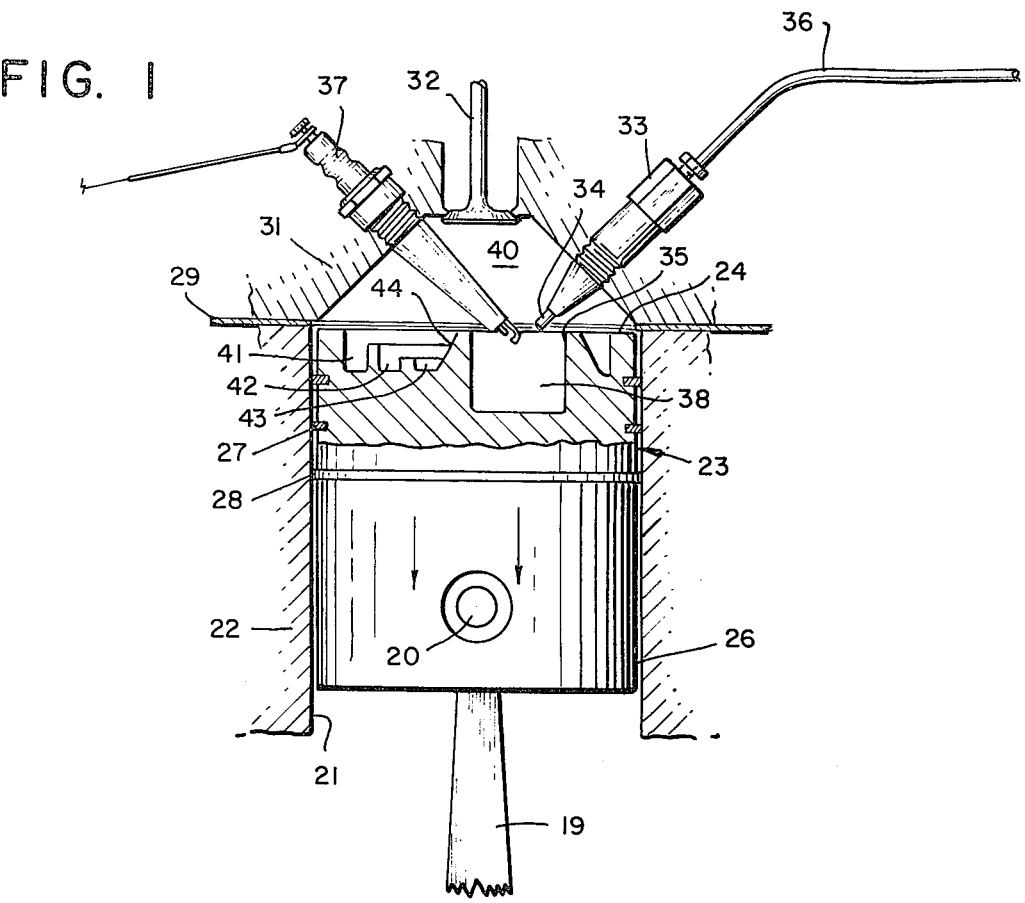
FIG. 1 illustrates a modified elevation view in cross section of an engine cylinder embodying the present piston.
Figure 2:
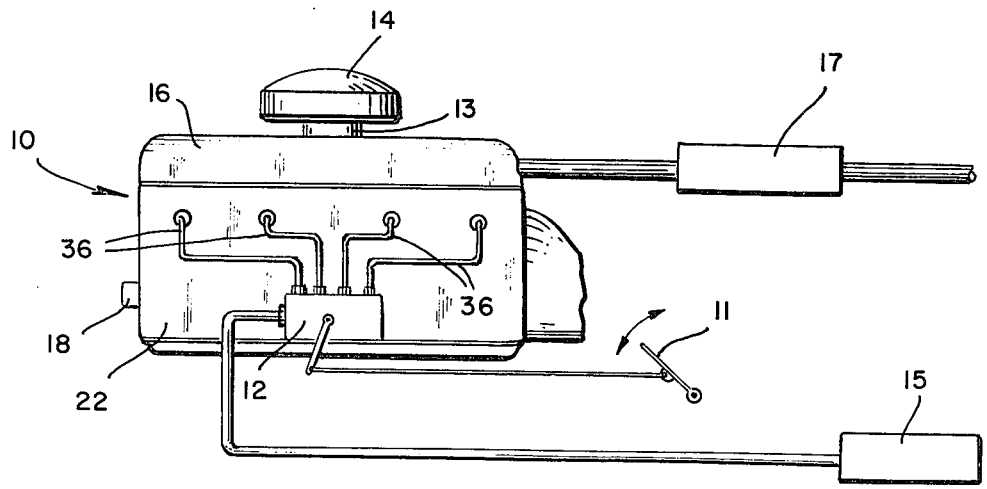
FIG. 2 is an environmental elevation of an automotive engine including a plurality of cylinders of the type shown in FIG. 1.
Figure 3:
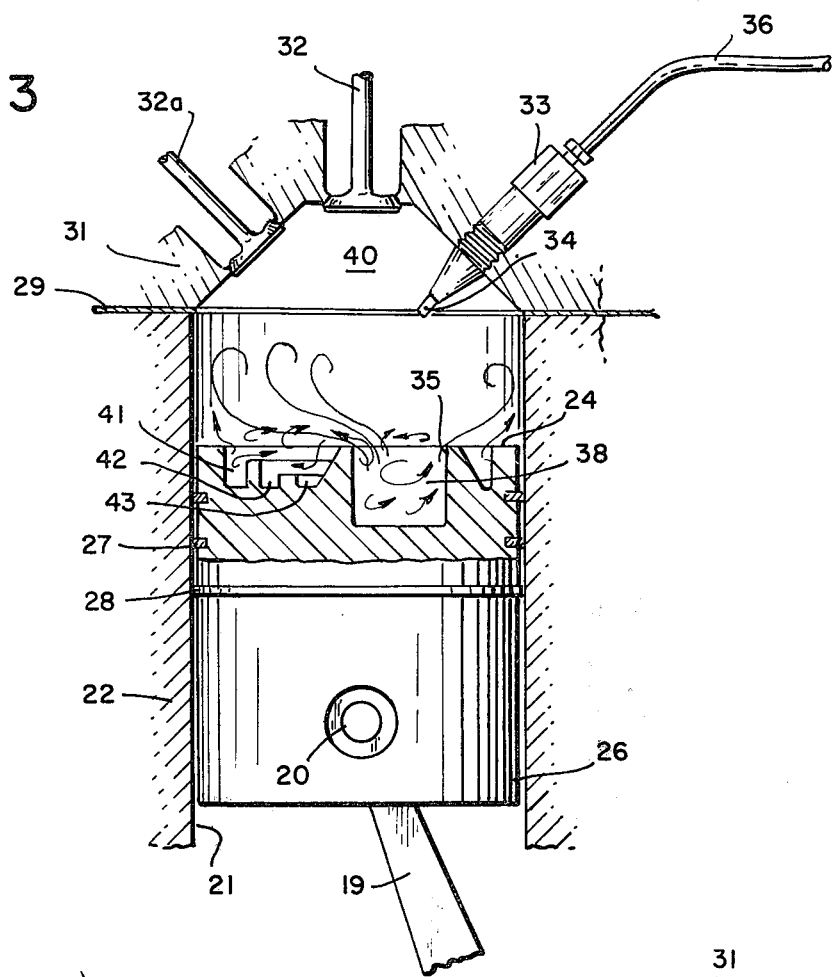
FIG. 3 is similar to FIG. 1 illustrating the piston in a position advanced from top dead center.

Normally, operation of the shown engine is through a single actuator or control lever 11 which is connected to fuel pump 12 whereby to vary the amount of fuel introduced to each cylinder to mix with the incoming air. Fuel quantity is regulated in accordance with the engine load and speed.

Air is generally introduced to the cylinder through an intake manifold 13 which is in turn provided with an air cleaner 14 or the like at the manifold inlet. An exhaust gas header 16 connected to each of the respective cylinders receives hot exhaust gases which can be conducted to a catalytic converter or muffler 17 prior to being passed to the atmosphere.

Referring to FIG. 1, the cylinder 21 shown is representative of the type cylinder normally utilized in an internal combustion engine. For example, such an engine generally embodies a plurality of such cylinders which can be as arranged in an in-line relationship. The respective cylinders are formed in the engine block 22, each cylinder having a piston 23 reciprocably mounted for movement through the cylinder bore.

Piston 23 includes an upper end or head, having a face 24, and a skirt 26 at the piston lower end. A connecting rod 19, is operably connected to piston 23 in the usual manner by way of a wrist pin 20 which permits the oscillatory motion of the piston. The connecting rod is journalled at its opposite end to the engine crankshaft 18.

Each piston 23 is normally provided with a plurality of compression and oil retaining rings 27 and 28 slidably mounted in a series of longitudinally spaced apart grooves in the piston's periphery. Thus, as piston 23 passes through cylinder bore 21, the respective rings in expanded condition engage the adjacent cylinder walls providing a sliding seal therewith.

The engine 10 upper end is provided with a gasket 29 and a head 31. Each cylinder 21 as shown in FIG. 1 is further provided with at least one intake valve 32 and an exhaust valve 32a. Said valves are operably connected through a common shaft or other suitable means to be sequentially actuated in accordance with the driving cycle of the engine.

Each engine cylinder is provided with a removable fuel injector 33 which traverses the cylinder head 31 wall. Said injector 33 includes an orifice 34 at the internal end, being disposed within the cylinder combustion chamber to assume a desired location with respect to the piston. The outer or external end of injector 33 is communicated through a line 36 to fuel pump 12 whereby fuel is periodically introduced to each cylinder combustion chamber.

The charge firing means in the present instance includes a spark plug 37 carried in the cylinder head of each cylinder having the spark terminals positioned adjacent to the injector nozzle orifve 34. Thus, as an integral part of the engine ignition system, the spark plug functions to ignite a combustible fuel-air mixture. The latter is formed initially in a localized area, between air within the combustion chamber 40 and the stream of fuel delivered from the fuel injector.

Figure 5:
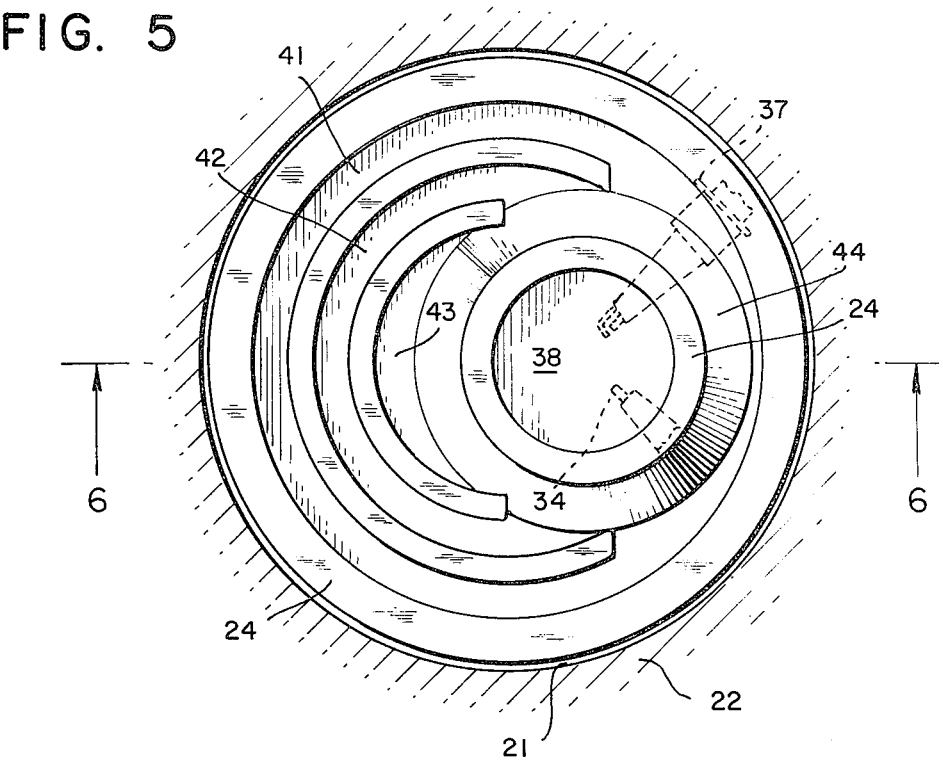
FIG. 5 is an enlarged top view of the piston shown in FIG. 1.
Figure 6:
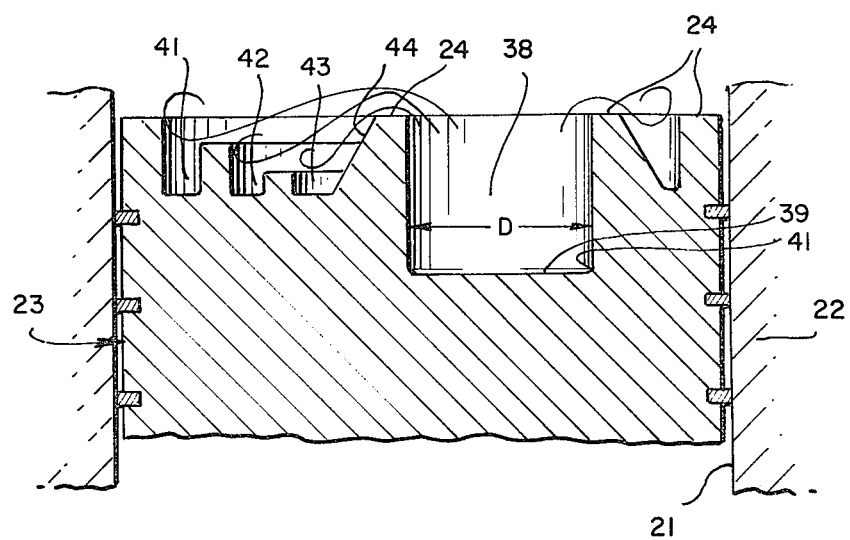
FIG. 6 is a cross sectional view taken along line 6—6 in FIG. 5.

Referring to FIG. 5, in the present engine, air is introduced into each combustion chamber 40 in a manner to be formed into a rotating or swirling mass about said chamber. This is achieved through intake valve 32 which, as noted, can be provided with a shroud or other flow guide means. Thus, air entering said intake valve 32 by way of intake inlet manifold 13 is directed into the cylinder and is immediately caused to swirl rapidly thereabout.

Piston 23 is provided at the upper end with a main cavity 38 which is arranged preferably in an offset position with respect to the piston central axis. As shown, cavity 38 assumes the general configuration of a cylindrical walled cup having a diameter D that is substantially less than the diameter of the piston. The lower end of the cavity defining the annular passage comprises a planar end wall 39 which merges with the cylindrical peripheral wall at junction 41.

Toward achieving the objectives of the invention, each piston 23 in the engine is provided as noted above with main cavity 38 into which part of the rapidly swirling air from combustion chamber 40 is urged during the piston compression stroke. Thereafter and during the subsequent power stroke, a flame front is circulated through and from cavity 38, as well as are air and combustion gases resulting from the burning of the fuel-air mixture. It should be noted however that at light engine load conditions, nearly complete combustion takes place in cavity 38 and excess air located in other parts of chamber 40 do not enter the combustion process.

Primary cavity 38 as presently shown is preferably provided with a substantially cylindrical upstanding wall configuration. As noted herein, during the piston compression stroke rapidly swirling air passes from combustion chamber 40 into the relatively small diameter cavity 38. This substantially increases the air mass rotational velocity, the propagation of the flame, and also fosters a more rapid burning of the charge.

Thereafter, introduction of a measured fuel stream from nozzle 34 into the cavity 38 will prompt the estabilishment of the localized combustible fuel-air mixture adjacent to injector nozzle 34. Fuel introduction takes place as piston 23 is in the approximately top dead center position, covering several degrees of piston travel. As the fuel-air mixture is rapidly carried from the vicinity of injector nozzle 34 toward spark plug 37, the latter is energized to intitiate combustion. Thus, the localized combustible mixture will be ignited at the spark plug, the resulting flame caused to propagate outwardly while simultaneously being carried about the cavity 38 peripheral wall in front of the expanding combustion gases.

At higher engine load conditions, for larger quantities of injected fuel, there is insufficient air available in cavity 38 to achieve complete combustion. In this instance, the swirling, burning fuel rich mixture spills over edge 35 of cavity 38. However, additional air is available in space 40 beyond cavity 38. The swirling burning mixture spills over edge 35 due to combination of factors. The latter include centrifugal force of the mass, and recession of the piston down the bore.

Figure 4:
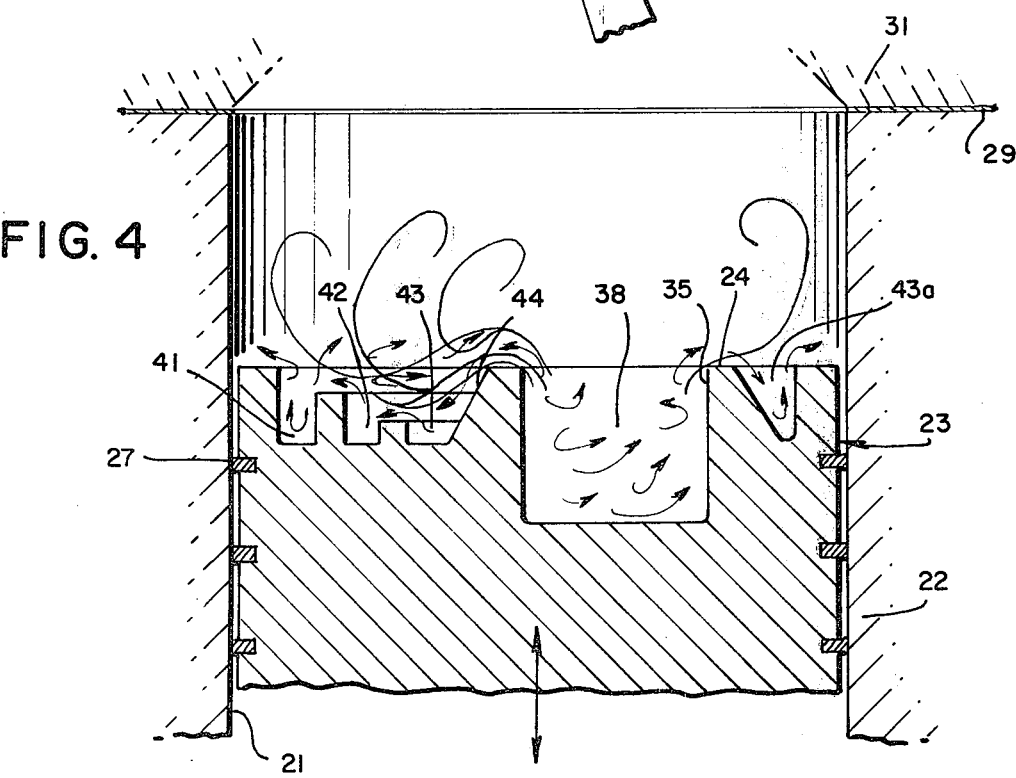
FIG. 4 is an enlarged segmentary cross sectional view of a portion of the piston shown in FIG. 3.

Normally this spill-over gas and air will be relatively ineffectual toward further promotion of the combustion event. However, and referring to FIG. 4, the radially flowing air and hot gas will be drawn into a series of supplementary or secondary recesses as 41, 42, 43 and 43a formed into the piston face. These recesses are positioned outwardly from the main cavity 38, and are so shaped to facilitate entry of the spilled out air and to further circulation of the latter. The disturbed flow will provide the desired turbulence of both air and gas to foster better mixing with injected fuel.

The induced swirl will, additionally, aid in the mixing of the respective gases, and therefore will further combustion as the burning continues. The swirl in chamber 40, continues around the axis of symmetry of the cylinder thereby additionally aiding the mixing process.

As shown in the embodiments of FIGS. 1, 3, 4, 5 and 6, piston face 24 is provided with the plurality of generally arcuate shaped grooves or depressions 41, 42 and 43 which radiate away from main cavity 38. Further, these grooves are spaced uniformly apart and cover a substantial portion of the piston face to better achieve the desired maximum turbulence as the piston recedes.

The respective piston face grooves are formed at a constant depth. Further, inner groove 43 is provided with a first or entry edge 44 having a downwardly sloping planar surface which forms a continuation of the piston face 24. Thereafter, the adjacent grooves 41 and 42 are formed concentric with said inner groove 43 to receive a rapidly flowing, yet disturbed air mass from the latter whereby to deflect the flow upwardly to promote the turbulent atmosphere about the piston face in general. The arcuate groove segments can be continuous, or they can be provided with suitable protrusions to further deflect the rotating, spill-over mass.

Referring further to FIG. 5, the respective fuel injector 33 and spark plug 37, are shown adjacently arranged to permit ignition of the desired rich fuel-air mixture immediately within the cavity and within the swirling air stream. Preferably injector 33 is positioned at such an angle as to introduce the predetermined fuel stream in a direction concurrent with the swirling air stream. This will establish a localized fuel patch having a fuel-air portion capable of being ignited by the spark plug 37.

Figure 7:
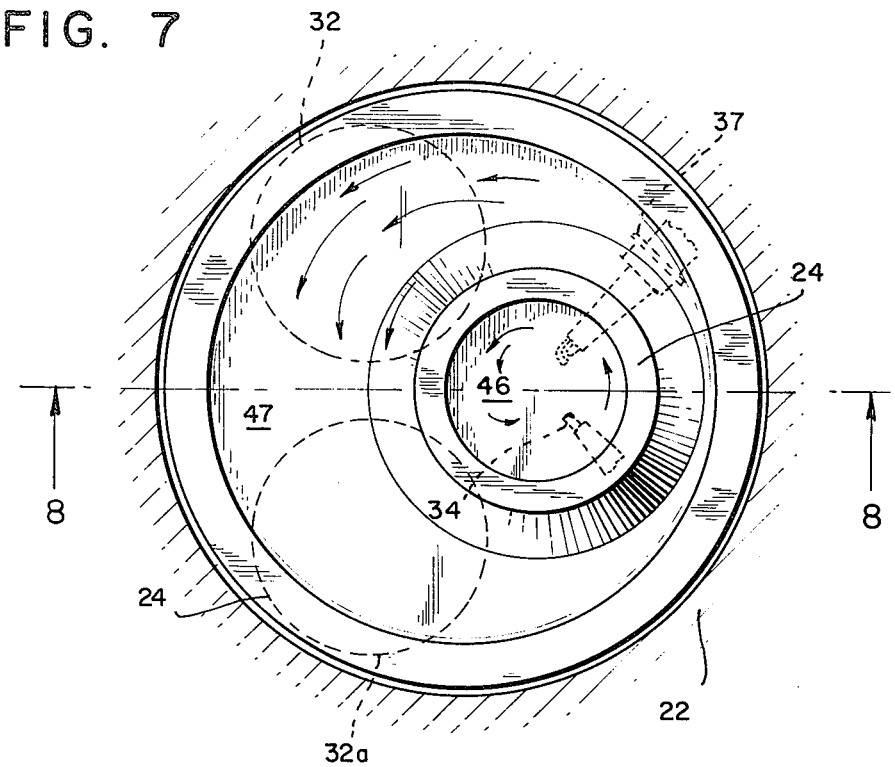
FIG. 7 is an alternate top view similar to that shown in FIG. 5.
Figure 8:
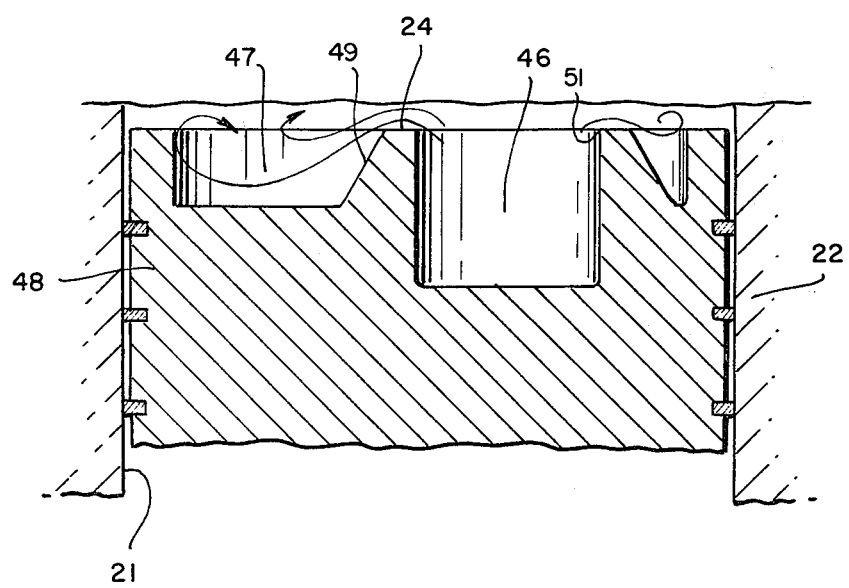
FIG. 8 is a cross sectional view taken along line 8—8 in FIG. 7.

In an alternate embodiment of the invention as shown in FIG. 7, primary or main cavity 46 is formed with a generally cylindrical configuration as in the instance of the embodiment in FIG. 5. However, in the present arrangement cavity 46 is provided with a continuous circular depression or groove 47 which completely surrounds said cavity 46 and into which the spill-over air and gas will follow as the piston 48 recedes from top dead center.

The innermost edge 49 of said circular groove is provided with a downwardly sloping contour to better accommodate the spill-over products, and to avoid creation of an eddying pattern at the base end of the sloping surface. Thereafter as piston 48 recedes, the air will be discharged from cavity 46, across the lip 51 of the latter as to form a turbulent atmosphere for achieving the desired mixing with fuel to permit a more even and rapid combustion of the entire charge.

Other modifications and variations of the invention as hereinbefore set forth may be made without departing from the spirit and scope thereof, and therefore, only such limitations should be imposed as are indicated in the appended claims.

I claim:

1. In an internal combustion engine including at least one cylinder, for an expandable combustion chamber, a piston operably positioned for reciprocating motion in said cylinder and a fuel injector being actuatable to introduce a stream of fuel to said expandable combustion chamber, and valve means opening into said combustion chamber for introducing a stream of air therethrough in a manner to cause said air to swirl rapidly about said combustion chamber, means forming a cylindrical walled primary cavity in the face of said piston and defining an open chamber therein, to receive fuel and swirling air, recess means formed into said piston face and positioned to receive a gaseous flow from said primary cavity during the piston power stroke, and defining at least one circular groove about said primary cavity, said at least one circular groove including an outwardly sloping wall connected with said piston face, and a substantially vertically sloping wall forming the periphery of said groove, whereby to facilitate intermixing of air with injected fuel to provide an improved combustion process.

2. In an apparatus as defined in claim 1, wherein said recess means further includes a plurality of circular grooves spaced outwardly of said primary cavity, said grooves from the plane of the piston face.

3. In an apparatus as defined in claim 2, wherein said circular grooves are positioned to define less than a complete recess about said central cavity.

* * * * *

UNITED STATES PATENT AND TRADEMARK OFFICE
CERTIFICATE OF CORRECTION

PATENT NO. : 4,009,702
DATED : March 1, 1977
INVENTOR(S) : EDWARD A. MAYER

It is certified that error appears in the above-identified patent and that said Letters Patent are hereby corrected as shown below:

Claim 2, line 4, after "grooves" insert --being of substantially constant depth when measured--

Signed and Sealed this

Twenty-ninth Day of May 1979

[SEAL]

Attest:

RUTH C. MASON
Attesting Officer

DONALD W. BANNER
Commissioner of Patents and Trademarks